United States Patent [19]
Ishimaru

[11] Patent Number: 5,926,681
[45] Date of Patent: Jul. 20, 1999

[54] DOCUMENT FEEDING DEVICE

[75] Inventor: Shuji Ishimaru, Yamanashi-ken, Japan

[73] Assignee: Nisce Corporation, Yamanashi-ken, Japan

[21] Appl. No.: 08/872,606

[22] Filed: Jun. 10, 1997

[30] Foreign Application Priority Data

Jun. 10, 1996 [JP] Japan ..................................... 8-171704

[51] Int. Cl.⁶ .......................... G03G 15/00; B65H 29/00
[52] U.S. Cl. .......................... 399/367; 271/186; 271/301; 271/303; 399/374
[58] Field of Search ..................................... 399/367, 374, 399/363, 364; 271/301, 186, 291, 303

[56] References Cited

U.S. PATENT DOCUMENTS

| 4,769,674 | 9/1988 | Kitajima et al. | 399/367 X |
| 5,296,908 | 3/1994 | Hatano et al. | 399/363 |
| 5,597,153 | 1/1997 | Maruyama et al. | 271/301 X |

FOREIGN PATENT DOCUMENTS

| 61-226425 | 10/1986 | Japan . |
| 1-126870 | 5/1989 | Japan . |
| 3-203730 | 9/1991 | Japan . |
| 8-133551 | 5/1996 | Japan . |

*Primary Examiner*—S. Lee
*Attorney, Agent, or Firm*—Kane, Dalsimer, Sullivan, Kurucz, Levy, Eisele and Richard, LLP

[57] ABSTRACT

A document feeding device mounted on an image processing device such as a copying machine for automatically feeding duplex original documents having images to be read on both sides to an image reading point one by one in such a manner that the document fed from a supply tray is reversed at a switchback part, sent through the image reading point to read the image on one side thereof, sent back to the switchback part to be turned upside down, again sent through the image reading point to read the image on the other side thereof, and then, discharged to a discharge tray. The documents can be rationally transported at high speed with high efficiency, and consecutively discharged to the discharge tray in the same order of page as those initially set on the supply tray.

15 Claims, 7 Drawing Sheets

DOCUMENT FEEDING DEVICE

BACKGROUND OF THE INVENTION

1. Field of the Invention

This invention relates to a device for automatically feeding original documents one by one to an image processing device such as a copying machine, and more particularly to a document feeding device capable of consecutively feeding duplex documents set on a supply tray in order of page to the image processing device and discharging, to a discharge tray, the documents in the same order of page as that of the documents initially set on the supply tray.

2. Description of the Prior Art

A variety of document feeding devices have been widely applied to image processing devices of various types such as a copying machine, image scanner and facsimile in order for automatically feeding one or more original documents to the image processing devices. However, there have so far been no document feeding device available for rationally handling a double-sided printed original document having images to be read on both sides thereof with good efficiency, which document will be simply referred to as "duplex document" hereinafter.

Generally, for reading the images on both sides of the duplex original document, document transporting means capable of turning over the duplex document in the document feeding device is required, but it is difficult to turn over and transport the document at high speed with high efficiency by use of a simple mechanism.

Japanese Patent Application Publication HEI 8-133551 (A) discloses one example of a conventional document feeding device having a function of turning over a duplex document for reading images on both sides of the document by use of a single reading means.

Figure 1A:
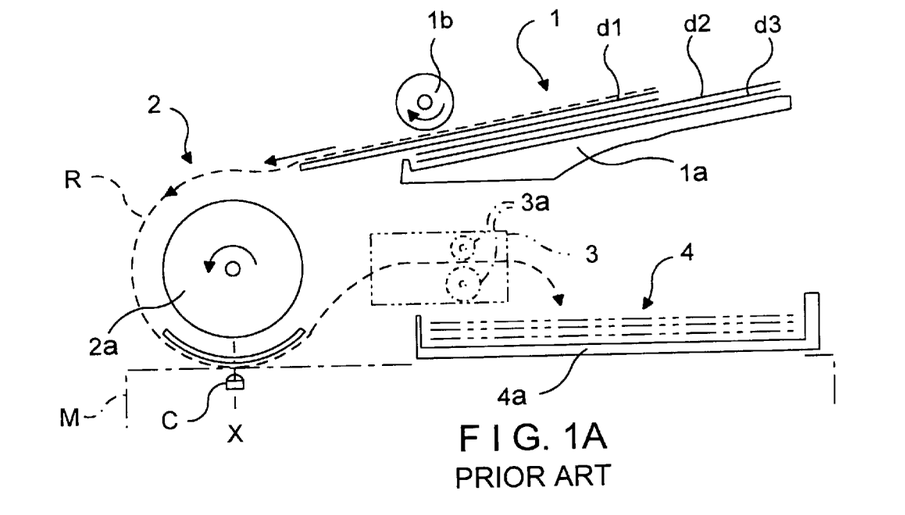
FIG. 1(A) and FIG. 1(B) are schematic diagrams explanatory of the flow of single-sided and double-sided duplex original documents in a prior art document feeding device.

The known document feeding device disclosed in the publication comprises a document supply part 1 for sending out one or more original documents dn (n=1,2,3, . . . ) to be image-processed one by one, a document transport part 2 including a forwarding roller 2*a* around which a document transport passage R is formed, a switchback part 3 disposed at a document exit so as to send the document back to the transport part 2 to turn the document over, and a document discharge part 4 having a discharge tray 4*a* to which the document is sent out through the switchback part 3 after being image processed, as shown in FIG. 1(A).

The document supply part 1 includes a document supply tray 1*a* on which the documents dn to be image-processed are stacked with the image surface upward, and document forwarding means 1*b* for sending out the documents stacked on the supply tray 1*a* one by one.

The switchback part 3 includes reversible rotating rollers 3*a* for switching back the document from the transport passage R to the transport passage R or discharging the document to the discharge tray 4*a*.

The aforementioned document feeding device is generally attached to an image reading portion of the image processing device M such as a copying machine in such a state that the forwarding roller 2*a* is opposite to image reading or scanning means C composed of a linear array CCD photoelectric element or the like mounted in the image processing device M.

When a single-sided printed document having an image to be read on one side thereof is given, the document d1 is transported along the passage R from the supply tray 1*a* to the discharge tray 4*a* through the image reading point X as shown by the dotted line in FIG. 1(A). When the document passes over the image reading means C located at an image reading point X, the image on the document is read by the image reading means C, and then, the document is sent out to the discharge tray 4*a* with the image surface downward. The following documents d2, d3, . . . are successively handled in the same manner as above and sent out onto the top of the document d1 which has already been discharged onto the discharge tray 4*a*. Thus, the documents finally placed on the discharge tray 4*a* are piled in the same order of page as that in the documents initially set on the supply tray 1*a*.

Figure 1B:
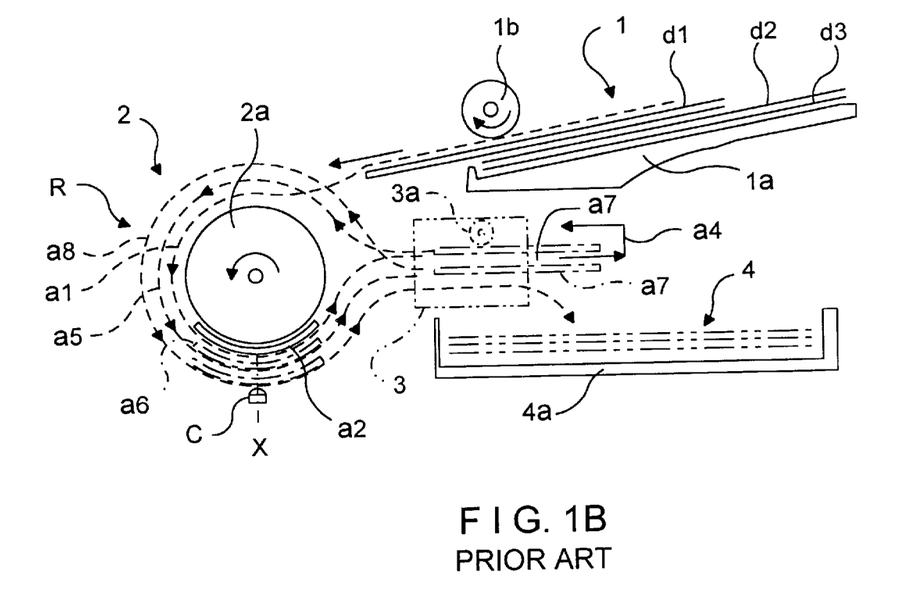

In a case that the given documents has images to be read on the odd-numbered and even-numbered pages thereof, i.e. duplex documents, the document must be turned over after the images on both sides of the document are read by the image reading means C, and then, sent out to the discharge tray 4*a* with the odd-numbered page facing downward, as shown in FIG. 1(B). That is, the uppermost of the duplex documents is first sent into the document passage R (a1), forwarded through the image reading point X with the odd-numbered page facing the image reading means C so as to read the image on the odd-numbered page by using the image reading means C (a2), and sent into the switchback part 3 (a3). The document introduced into the switchback part 3 is sent back into the document passage R by reversing the rollers 3*a* (a4).

The document forwarded along the document passage R travels around the forwarding roller 2*a* (a5) and again forwarded through the image reading point X with the even-numbered page facing the image reading means C so as to read the image on the even-numbered page by using the image reading means C (a6), and then, it is sent into the switchback part 3 (a7). If the document sent into the switchback part 3 after reading the images on both sides thereof is direct sent out to the discharge tray 4*a*, the odd-numbered page of the document faces upward, as a result of which the first document d1 and following documents d2, d3, . . . which are finally piled on the discharge tray 4*a* are not in the same order of pages as that of the documents initially set on the supply tray 1*a*.

Therefore, the document sent into the switchback part 3 upon completion of reading the images on both sides of the document is sent back to the document passage R once more, made circulate about the forwarding roller 2*a* to be turned upside down (a8), and then, sent out to the discharge tray 4*a* through the switchback part 3 (a9). Consequently, the document finally lying on the discharge tray 4*a* has the odd-numbered page facing downward, and the following documents are discharged in the same order of page as that of them initially set on the supply tray 1*a*.

Thus, in order to finally take the duplex documents out from the discharge tray 4*a* in the same order of page as that of them initially set on the supply tray 1*a*, the documents must travel at least three rounds of the document passage R around the forwarding roller, resulting in decrease in operation speed and efficiency of the document feeding device.

Furthermore, the circumference of the forwarding roller 2*a* in the aforenoted conventional device must be made equal to or larger than the length of the maximum document which is permitted to be handled by the document feeding device so as to prevent the front end and rear end of the document, which possibly move in the opposite directions in the switchback part 3, from coexisting in the switchback part 3 when the document is sent into the switchback part 3 and returned to the transport passage R around the roller 2*a*.

Thus, the forwarding roller 2a cannot be made small in diameter, entailing difficulty in making the document feeding device compact.

OBJECT OF THE INVENTION

One object of the present invention is to provide a document feeding device capable of rationally and stably transporting one or more single-sided or double-sided original documents one by one to an image processing device at high speed with good efficiency.

Another object of this invention is to provide a document feeding device capable of consecutively feeding duplex original documents and conveniently taking out the discharged documents upon completing desired image processing in the same order of page as that of the documents initially set.

Still another object of this invention is to provide a document feeding device which is easy to handle and can be made compact regardless of the size of the document to be dealt with.

Yet another object of this invention is to provide a document feeding device applicable to image processing or reading devices of various sorts such as a copying machine, image scanner and facsimile.

SUMMARY OF THE INVENTION

To attain the objects described above according to the present invention, there is provided a document supply part having a document feeding device comprising a supply tray for stacking documents and a document forwarding mechanism for sending the documents one by one from the supply tray to a supply passage, a document transport part having a forwarding roller around which a transport passage is formed, a switchback part having a switchback passage, and a document discharge part having a discharge passage and a discharge tray.

With the transport passage in the document transport part, there are connected the supply passage at a supply junction which is substantially opposite to image reading means disposed in an image processing device across the forwarding roller, the switchback passage at a switchback junction, and the discharge passage at a discharge junction which is substantially opposite to the switchback junction across the forwarding roller.

At the switchback junction and discharge junction, switching members are respectively disposed for changing the traveling course of the document.

The switchback part includes reversible switchback rollers for introducing the document from the transport passage around the forwarding roller into the switchback passage, and then, sending back the document to the transport passage so as to turn the document over.

The switchback rollers in the switchback part are in contact with each other so as to selectively move the document back and forth and separable from each other so that the front end and rear end of the document, which possibly move in the opposite directions and coexist in the switchback passage when the document is longer than the circumference of the forwarding roller, is prevented from interfering with each other. Therefore, the forwarding roller can be made small in diameter regardless of the size of the document to be handled.

Duplex documents each having images to be read on both sides thereof are initially stacked on the supply tray in the order of page with their odd-numbered pages upward, and sent out in the order from the uppermost document to the lower document in succession. The document is introduced from the supply passage into the switchback passage through the transport passage between the supply junction and the switchback junction, and then, sent back to the transport passage toward the image reading point by reversing the switchback rollers in the switchback part, consequently to be turned over. The image on the even-numbered page of the document thus turned over is read by the image reading means placed at an image reading point when the document passes through the image reading point. The document is further forwarded along the transport passage around the forwarding roller through the discharge junction and the supply junction and again introduced into the switchback passage, so that the document is turned over once more by being sent back into the transport passage toward the image reading point. As a result, the image on the odd-numbered page of the document is read by the image reading means when the document passes through the image reading point. Upon completion of reading the images on both sides of the duplex document, the document is sent out to the discharge tray through the discharge passage with its odd-numbered page facing downward.

The remaining documents on the supply tray are consecutively fed along the transport passage and discharged onto the discharge tray with their odd-numbered pages facing downward in the same manner as that in which the preceding document is transported. Consequently, the documents discharged onto the discharge tray are in the same order as that in which the documents are initially stacked on the supply tray, and therefore, can easily be taken out from the discharge tray last of all.

Thus, since the duplex document may pass through the image reading point only two times for reading the images on both sides, the document can be rationally transported at high speed with great efficiency.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 6(A) through FIG. 6(I) show the sequence of operation in transporting the duplex document in the device of this invention.

DESCRIPTION OF THE PREFERRED EMBODIMENTS

In general, the document feeding device according to this invention is mounted on an image processing device M such as a copying machine so as to overlay a platen P of transparent glass or the like on which an original document to be read is placed.

Figure 2:
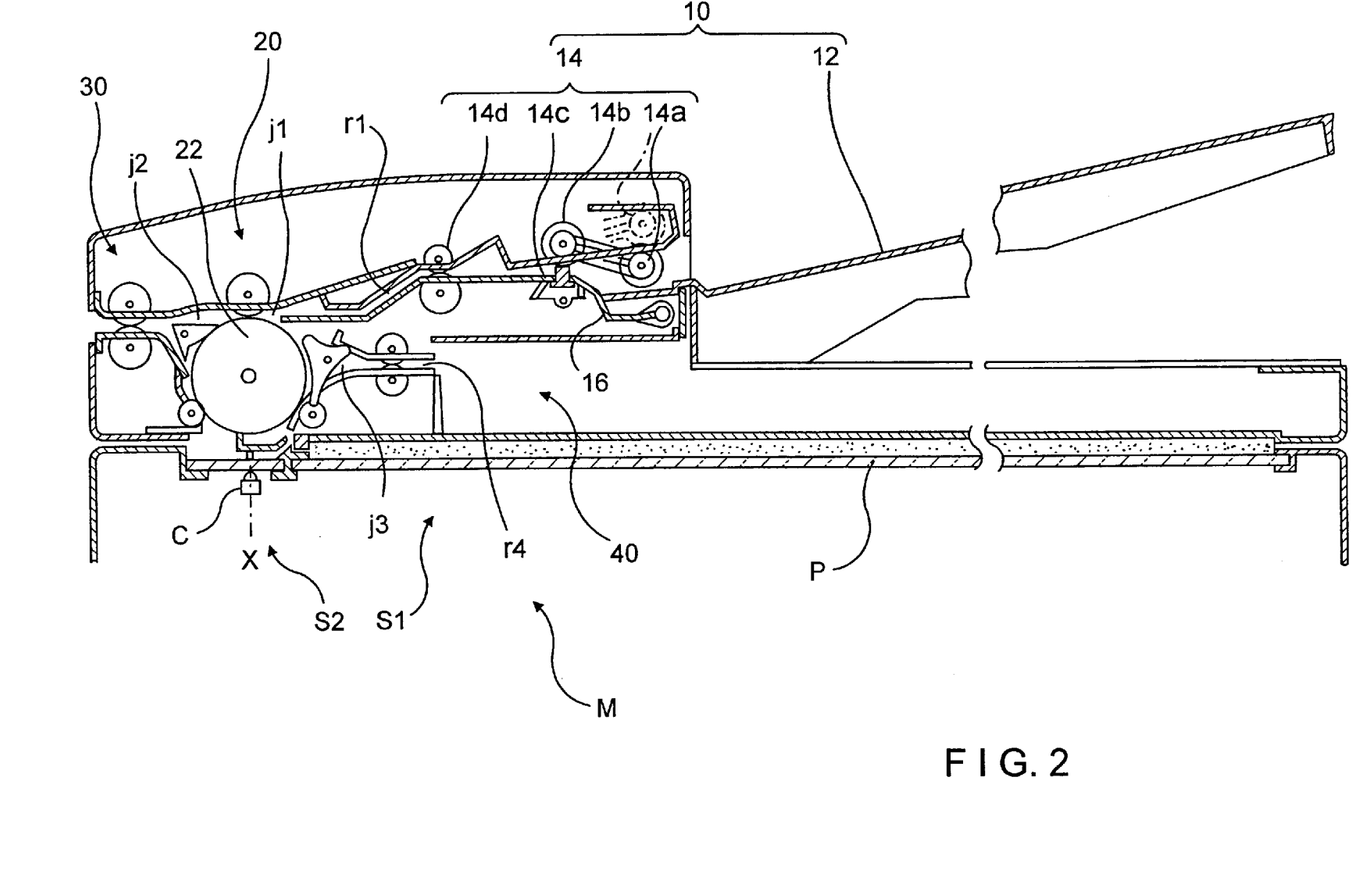
FIG. 2 is a side section schematically showing one embodiment of a document feeding device according to the present invention.

The illustrated copying machine M has a plane image scanning region S1 defined by a wide area platen P on which the original document is set in place to scan the entire surface of the document in the rest state, and a linear image scanning region S2 in which the document is read on the line in the width (main scaning) direction by image reading means C such as a linear array CCD photoelectric element while being moved in the lengthwise (subscanning) direction. The document feeding device of this invention particularly serves to pass the given original document through an image reading point X at which the image reading means C is placed in the linear image scanning region S2. Accordingly, the aforesaid plane image scanning region S1 is not absolutely necessary to this invention. Thus, the device of this invention is applicable to any image processing devices having at least such a linear image scanning region S2 as noted above, and therefore, is particularly suitable for a portable facsimile and portable image scanner. That is, the subject image processing devices to which this invention is applicable are by no means limitative.

Figure 3:
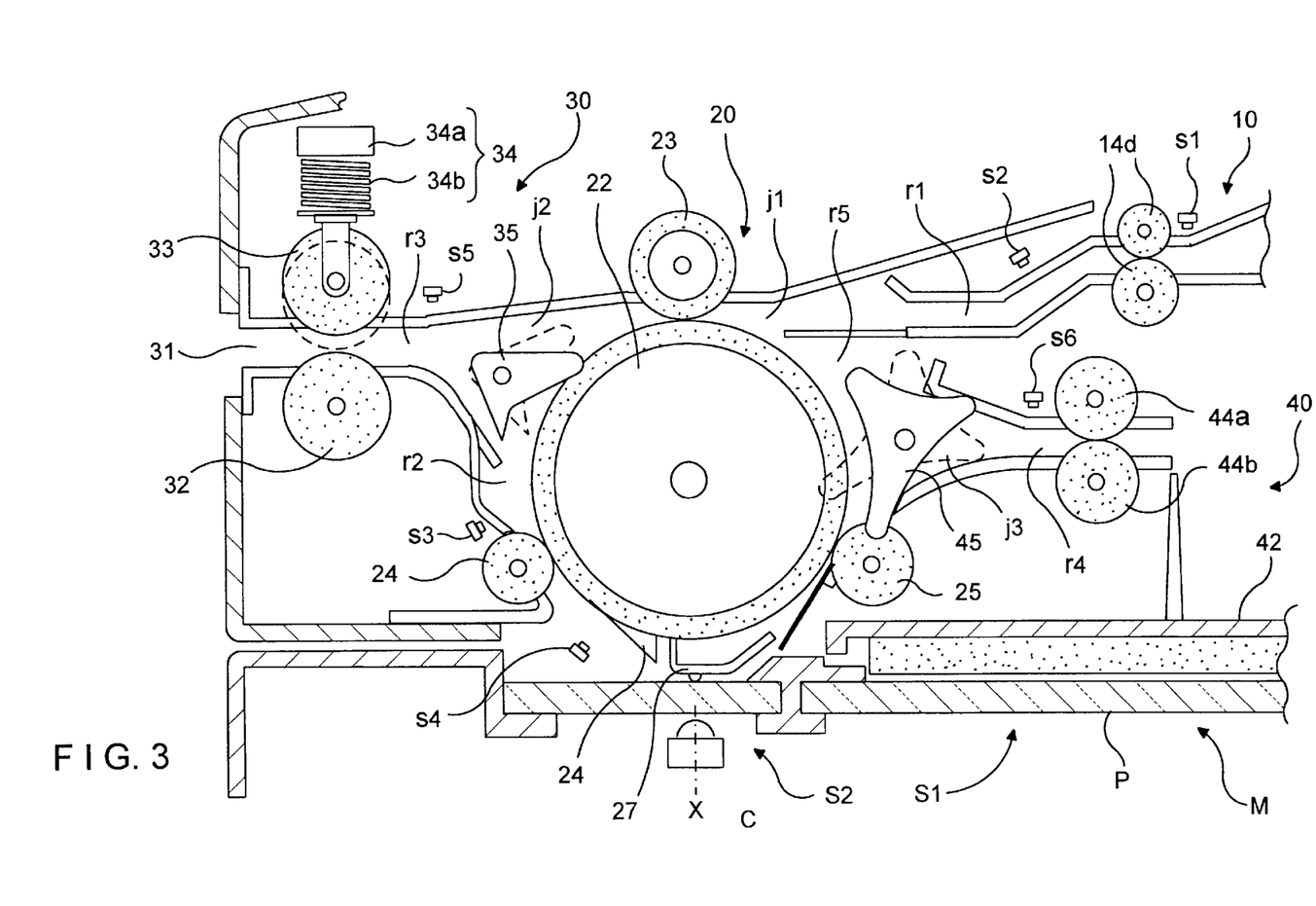
FIG. 3 is an enlarged side section schematically showing the document transporting mechanism in the device of FIG. 2.

The document feeding device of the invention comprises a document supply part 10 including a supply tray 12 on which one or more original documents dn (n=1,2,3, ...) are initially stacked, and a document forwarding mechanism 14 for sending out the documents dn from the supply tray 12 one by one to a supply passage r1; a document transport part 20 including a forwarding roller 22 around which a transport passage r2 is formed; a switchback part 30 having a switchback passage r3; and a document discharge part 40 having a discharge passage r4 and a discharge tray 42 to which the document is discharged after being imaged.

Along the transport passage r2 formed around the forwarding roller 22, the given document is circulated by the forwarding roller 22 which rotates in one document forwarding direction (counterclockwise direction in the accompanying drawings).

With the transport passage r2 in the document transport part 20, there are connected the supply passage r1 at a supply junction j1 defined around the forwarding roller 22, the switchback passage r3 at a switchback junction j2, and the discharge passage r4 at a discharge junction j3.

The supply junction j1 is substantially opposite to the image reading means C disposed at the image reading point X in the image processing device M across the forwarding roller 22. Namely, the supply junction j1 is located on the substantially upper side of the forwarding roller 22, and the image reading point X is located on the substantially lower side of the roller 22. The switchback junction j2 is located on the route from the supply junction j1 to the image reading point X, i.e. on the substantially left half path of the transport passage r2 in the drawings.

The discharge junction j3 is substantially opposite to the switchback junction j2 across the forwarding roller 22. That is, the discharge junction j3 is located on the route from the image reading point X to the supply junction j1, i.e. on the substantially right half path of the transport passage r2 in the drawings. The path from the discharge junction j3 to the supply junction 1 serves as a return passage r5.

However, the angle relation among the supply junction j1, switchback junction j2, image reading point X and discharge junction j3 is by no means limited. The supply junction j1, switchback junction j2, image reading point X and discharge junction j3 may be lined along the document transport passage r2 around the forwarding roller 22 in order in the document forwarding direction (counterclockwise direction in the drawings).

Although the structure of the document supply part 10 is not specifically limited, the document forwarding mechanism 14 of the document supply part 10 generally includes a kick roller 14a swingable vertically and rotatable for sending out the uppermost of the original documents stacked on the supply tray 12 into the supply passage r1, separation means comprising a separation roller 14b and a separation pad 14c which are in contact with each other for allowing only one document to pass therethrough, and register rollers 14d for making skew correction for the document advancing along the supply passage r1. An element 16 is a retractable gate for selectively detaining the documents on the supply tray 12. The document forwarding mechanism 14 including the gate 16 is not indispensable constituents of the invention.

Before and behind the register rollers 14d in the supply passage r1, there are disposed document sensors s1 and s2 so that the front end or rear end of the document passing along the supply passage r1 is detected for controlling the timing of operating the components of the device and confirming the existence of the document in the supply passage r1. By detecting the front end of the document with the document sensor s1, skew correction for the document is effected.

The forwarding roller 22 is not specifically limited in diameter, but may be made small regardless of the size the document to be read. That is to say, the circumference of the forwarding roller 22 may be shorter than the length of the maximum document which is permitted to be handled by the document feeding device of this invention or the image pressing device M. Consequently, the document feeding device of this invention can be made compact.

Around the forwarding roller 22, there are disposed a guide roller 23, register roller 24 and guide roller 25. The guide roller 23 and 25 are in press contact with the roller 22 so as to rotate in conjunction with the forwarding roller 22 to stably forwarding the document Before the register roller 24, there is disposed a document sensor s3 so that the register roller 24 stops until a prescribed time passes after the front end of the document is detected by the sensor S3, thus to make skew correction for the document advancing along the transport passage r2.

A document sensor s4 disposed behind the register roller 24 serves to control the timing of image reading carried out by the image reading means.

Reference numeral 26 denotes a guide member for guiding the document to the image reading point X, and numeral 27 denotes a pressure member for pressing the document passing through the image reading point X against the platen of the linear image scanning region S2.

The switchback part 30 includes a pair of reversible switchback rollers 32 and 33 for selectively moving the document back and forth along the switchback passage r3. The switchback passage r3 is open at the opposite side (left end in the drawings) of the switchback junction j2 to form an opening 31 through which the document sent deep into the switchback passage r3 is partially expelled out of the switchback passage r3.

The switchback roller 32 is a stationary driving roller rotatable in both directions. The other roller 33 is a driven roller which is in resilient contact with and separable from the driving switchback roller 32 by lifting means 34 comprising an actuator 34a for electromagnetically raising the switchback roller 33 and a spring member 34b for urging the switchback roller 33 downward.

At the switchback junction j2, there is disposed a switchback switching member 35 for selecting the document path from the supply passage r1 or return passage r5 to the switchback passage r3 (state depicted by the solid line in FIG. 3) or to the transport passage leading to the image reading point X (state depicted by the imaginary line).

Before the switchback rollers 32 and 33 in the switchback part 30, there is disposed a document sensor s5 for detecting the front end or rear end of the document introduced into the switchback passage r3, so that the document is sent into the switchback passage r3 until the rear end of the document is detected by the document sensor s5 and sent backward when the rear end is detected.

Although the switchback passage r3 is generally shorter than the length of the document to be dealt with, most of the front half of the document which is sent into the switchback passage r3 by rotating the switchback rollers 32 and 33 until detecting its rear end with the document sensor s5 is expelled out of the switchback passage r3 through the opening 31. When the rear end of the document is detected by the sensor s5, the switchback rollers 32 and 33 are reversed to draw the document into the switchback passage r3.

The document discharge part 40 is provided with a pair of discharge rollers 44a and 44b in the discharge passage r4, so that the document sent into the discharge passage r4 is discharged to the discharge tray 42.

At the discharge junction j3, there is disposed a discharge switching member 45 for selectively conducting the document sent from the transport passage r2 through the image reading point X to the return passage r5 (state depicted by the solid line in FIG. 3) or the discharge passage r4 (state depicted by the imaginary line in FIG. 3).

Before the discharge rollers 44a and 44b, there is disposed a document sensor r6 for detecting the document so as to determine whether the document feeding operation should be finished or continued to start feeding the next original document remaining on the supply tray 12.

The principle of operation of the aforementioned document feeding device according to this invention will be described with reference to FIG. 4 and FIG. 5.

Figure 4:
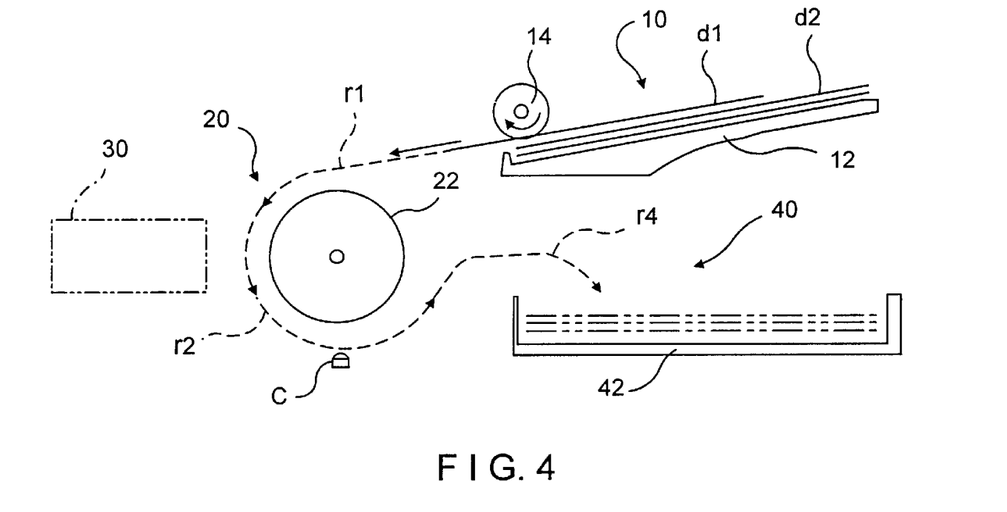
FIG. 4 is a schematic view showing the pathway of a single-sided original document in the device of this invention.

FIG. 4 shows the pathway along which a single-sided original document having an image to be image-processed on one side thereof is transported. The single-sided original documents dn (n=1,2,3, ...) which are set on the supply tray 12 with their image surfaces facing upward are sent out one by one from the uppermost document in order by operating the document forwarding mechanism 14. The document dn sent out from the supply tray 12 is introduced into the transport passage r2 around the forwarding roller 22 and read by the image reading means C disposed at the image reading point X while passing through the image reading point X along the transport passage r2 as indicated by the dotted line in the drawing. The document after being image-processed is sent out to the discharge tray 42 through the discharge passage r4.

The discharged document is put on the discharge tray 42 with the image surface downward, and the following documents d2, d3, ... consecutively fed to be subjected to image processing are also discharged onto the discharge tray 42 with their image surfaces downward in succession. Thus, the documents finally lying on the discharge tray 42 can be conveniently taken out last of all in the same order of page as that of them initially set on the supply tray 12.

Figure 5:
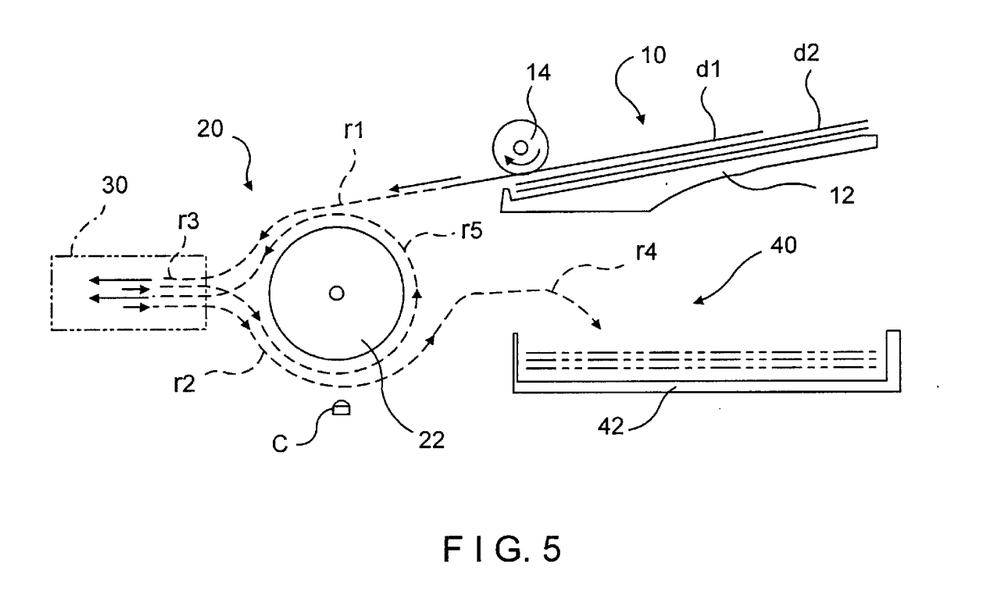
FIG. 5 is a schematic view showing the pathway of a duplex original document in the device of this invention.

FIG. 5 shows the pathway along which a double-sided original document (duplex document) having images to be read on both sides thereof is transported. The sequence of transporting the duplex document and the operational states of component elements of the device when transporting the duplex document are shown in FIG. 6(A) through FIG. 6(I).

Figure 6A:
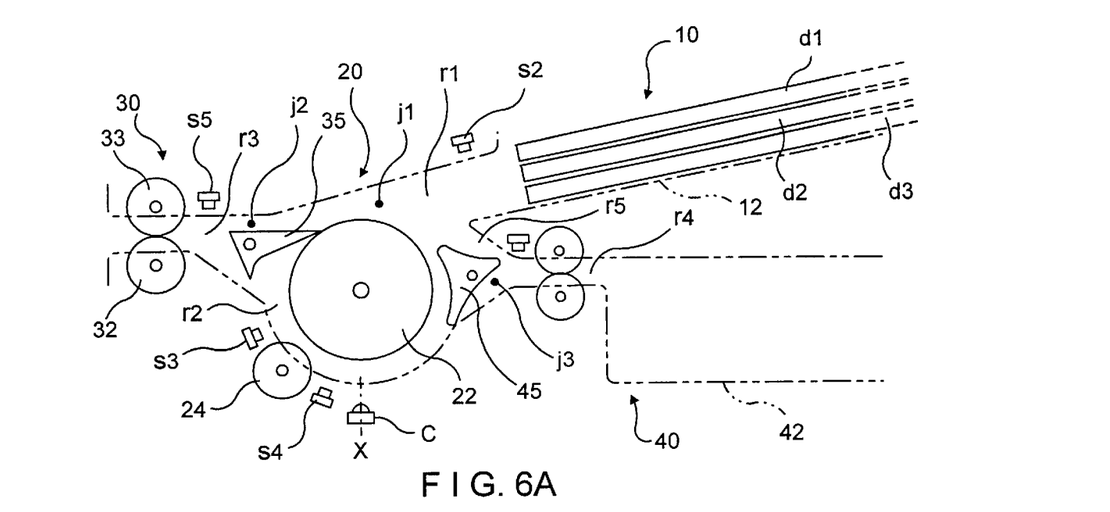

Initially, the duplex documents dn (n=1,2,3, ...) with their odd-numbered surfaces upward are set on the supply tray 12 (FIG. 6(A)).

Figure 6B:
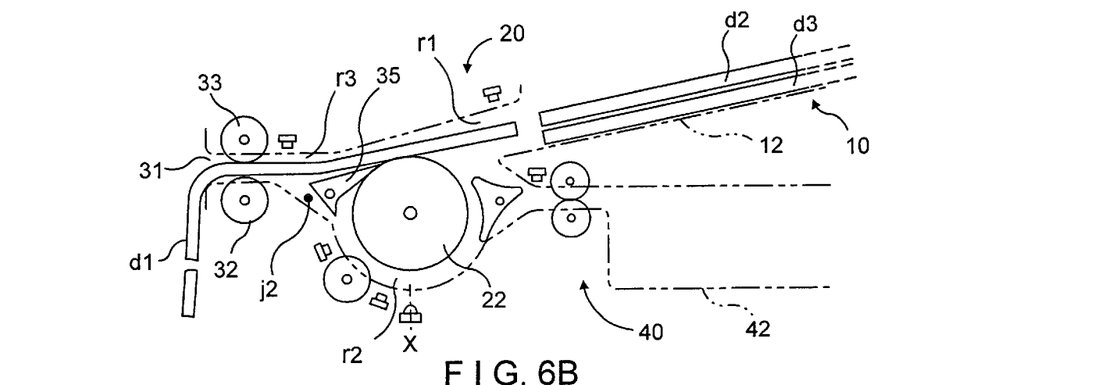

By operating the document forwarding mechanism 14, the uppermost first page document d1 is first sent out from the stack of documents on the supply tray 12 to the supply passage r1. The document is further sent into the transport passage r2 and forwarded by the forwarding roller 22 which rotates in the forwarding direction (counterclockwise direction in the drawing). At this time, the switchback switching member 35 at the switchback junction j2 assumes the state of connecting the supply passage r1 with the switchback passage r3 through a part of the transport passage r2 between the supply junction j1 and the switchback junction j2. Thus, the document d1 is sent into the switchback passage r3 via the switchback junction j2 (FIG. 6(B)).

Figure 6C:
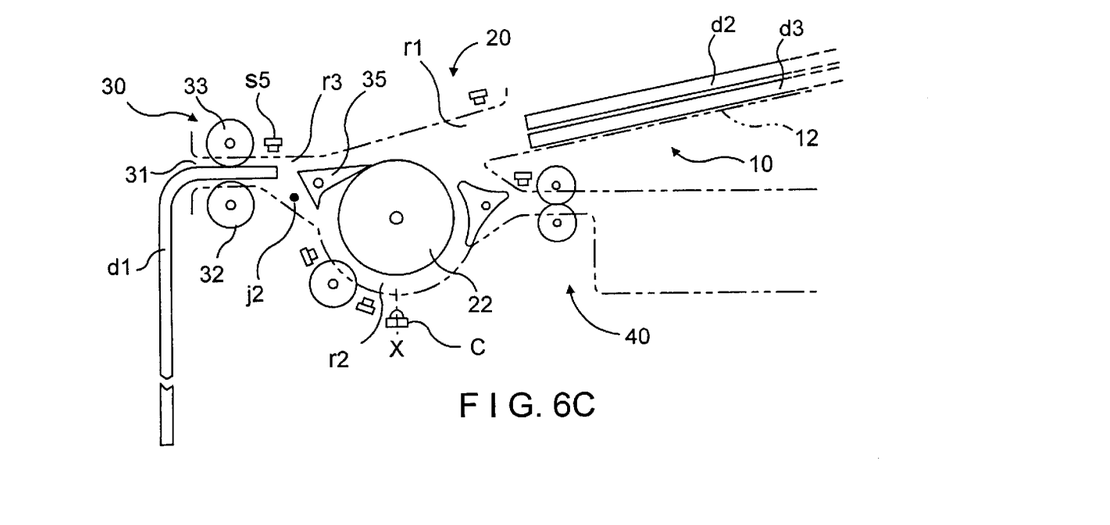

The document d1 is further sent into the switchback passage r3 until the rear end of the document is detected by the sensor s5 (FIG. 6(C)). When the rear end of the document is detected, the switchback rollers 32 and 33 are reversed to send back the document toward the switchback junction j2, and simultaneously, the switchback switching member 35 is switched over to the state of connecting the switchback passage r3 to the transport passage leading to the image reading point X as illustrated in FIG. 6(C).

Figure 6D:
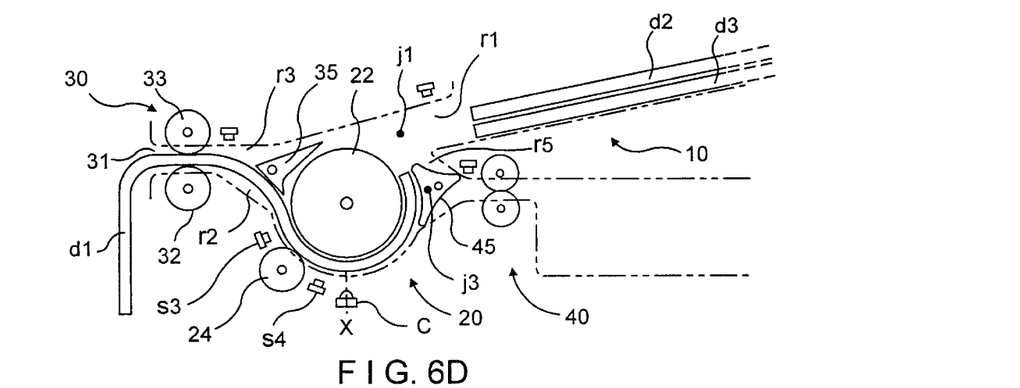

Consequently, the document d1 is sent into the transport passage r2 with the rear end at the head and forwarded toward the image reading point X with the odd-numbered page facing the forwarding roller 22. When the document d1 passes through the image reading point X, the image on the even-numbered page (lower surface in FIG. 6(D)) of the document is read by the image reading means C. At this time, the discharge switching member 45 assumes the state of closing the discharge passage r4 and connecting the transport passage r2 with the return passage r5 as illustrated. Thus, the document d1 advances toward the supply junction j1.

Figure 6E:
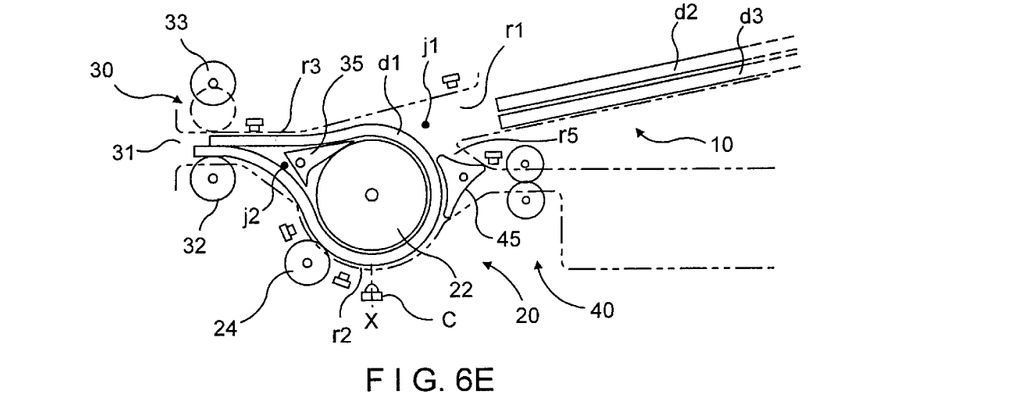

Then, the document d1 is introduced into the switchback passage r3. At this time, if the document is longer than the circumference of the forwarding roller 22, the rear end part and the front end part of the document d1 possibly coexist in the switchback passage r3 as shown in FIG. 6(E). Although the rear and front end parts of the document, which move in opposite directions in the switchback passage r3, the switchback roller 33 is separated from the switchback roller 32 so as to prevent the rear and front end parts of the document from interfering with each other as illustrated.

Figure 6F:
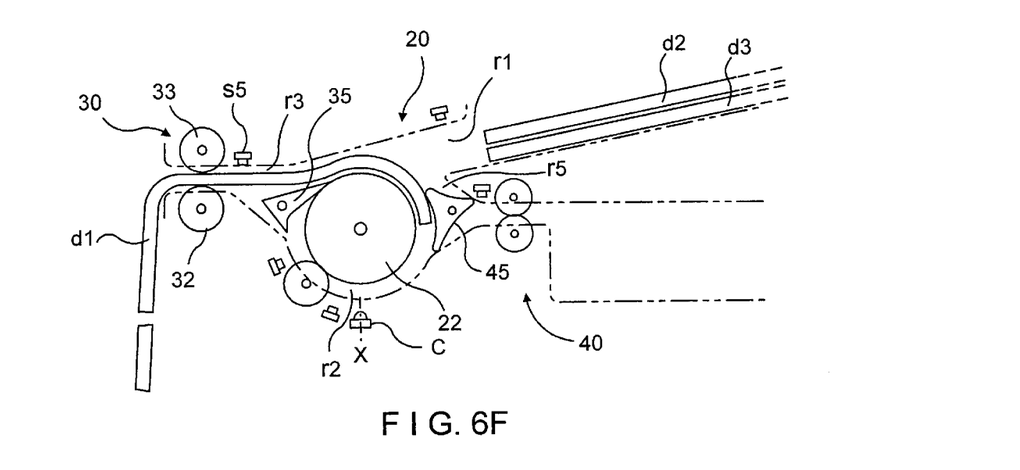
Figure 6G:
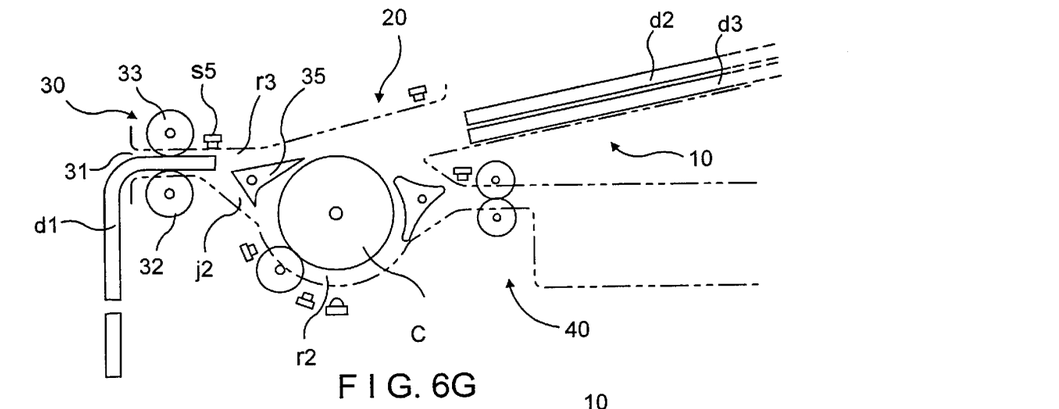

The document d1 is further sent into the switchback passage r3 (FIG. 6(F)), and sent back when the tail end (front end of the reversing document in reality) is detected by the sensor s5 (FIG. 6(G)).

Figure 6H:
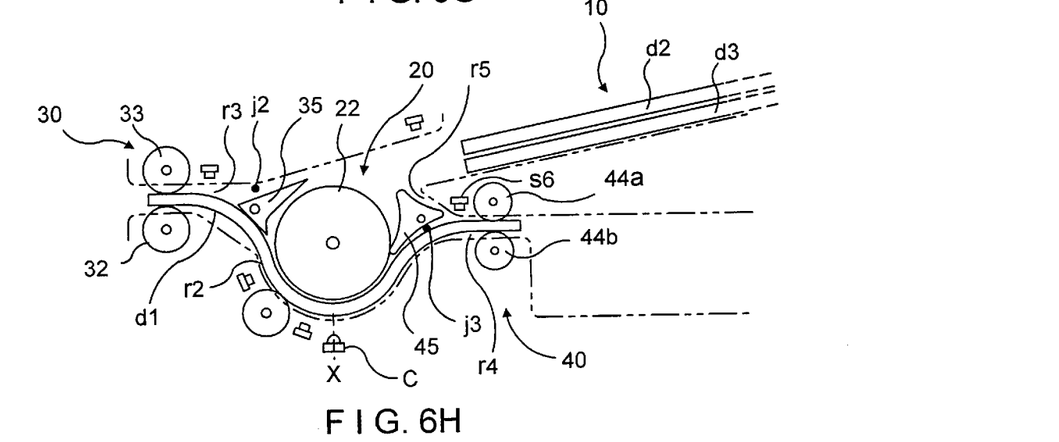
Figure 6I:
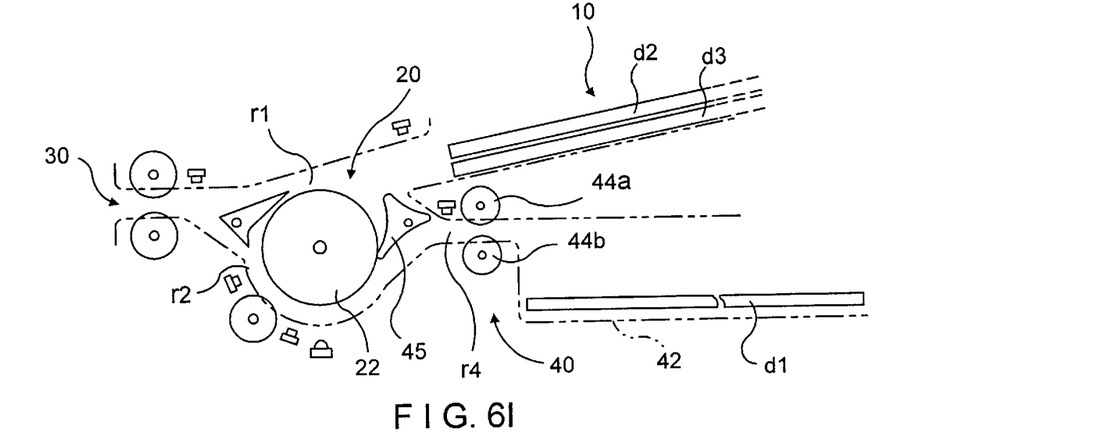

The document sent from the switchback passage r3 is forwarded along the transport passage r2 and passes through the image reading point X so as to read the image on the odd-numbered page as shown in FIG. 6(H). As this time, the discharge switching member 45 assumes the state of connecting the transport passage r2 with the discharge passage r4. Thus, the document passing through the image reading point X is sent into the discharge passage r4, and then, sent out to the discharge tray 42 by driving the discharge rollers 44a and 44b as shown in FIG. 6(I).

The discharged document d1 is landed on the discharge tray 42 with the odd-numbered page downward, and the following documents d2, d3, . . . to be consecutively processed are also discharged onto the top of the document d1 on the discharge tray 42 with their odd-numbered pages downward. Thus, the documents finally lying on the discharge tray 42 can be advantageously taken out in the same order of page as that of them initially set on the supply tray 12.

As a matter of course, the timing with which the components of the device commence or stop operations varies with the arrangement and performance of the components, the size and properties of the document to be dealt with, the operational conditions of the device and other possible factors, and thus, it is by no means limited. That is, the operations of the components including electric motors, electromagnetic actuators and other elements necessary for the document feeding device may be arbitrarily controlled by use of common controlling means.

The document feeding device of the invention as noted above makes it possible to deal with the duplex document only by circulating the document approximately one and three-fourth times around the forwarding roller 22 as is obvious from FIG. 5, and conveniently take out from the discharge tray 42 last of all, the sheaf of discharged documents discharged in the same order of page as that of them initially set on the supply tray 12. Incidentally, the conventional document feeding device as shown in FIG. 2 compels the duplex document to pass through the image reading point X three times, but only twice passing suffices for the device of this invention. Thus, the duplex document can be transported rationally at high speed without incurring any damage by use of the device of the invention.

Furthermore, the present invention enables the forwarding roller 22 to be sufficiently small relative to the length of the document to be dealt with, because the switchback rollers 32 and 33 arm separable so as to prevent the rear and front end parts of the long document from interfering with each other, which possibly coexist in the switchback passage r3 as illustrated in FIG. 6(E). Besides, since the document introduced deep into the switchback passage by operating the switchback rollers 32 and 33 is partially expelled out of the switchback passage through the opening 31 formed at the outside end of the switchback passage, the switchback passage can be made short to any degree. Accordingly, the document feeding device having excellent functions as described above can be made compact due to the sufficiently small forwarding roller 22 and the short switchback passage. Moreover, the device of the invention can be applied to various image processing devices such as a copying machine, facsimile and image scanner, even to such image processing devices of portable size.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A document feeding device for feeding and discharging one or more documents relative to an image reading point at which image reading means is disposed in an image processing device, comprising a document supply part having a supply tray for stacking said one or more documents thereon, a supply passage, and a document forwarding mechanism for sending out said documents stacked on said supply tray one by one through said supply passage; a document transport part having a forwarding roller around which a transport passage is formed, said transport passage being connected with said supply passage at a supply junction being substantially opposite to said image reading point across said forwarding roller; a switchback part having a switchback passage connected with said transport passage at a switchback junction; and a document discharge part having a discharge passage connected with said transport passage at a discharge junction being substantially opposite to said switchback junction across said forwarding roller, and a discharge tray to which the document is discharged through said discharge passage, said transport passage including a return passage between said discharge junction and said supply junction.

2. A document feeding device according to claim 1, wherein said switchback part further comprises two switchback rollers and wherein one of said two switchback rollers is provided with lifting means and separable from the other of said two switchback roller by operating said lifting means.

3. A document feeding device according to claim 1, wherein said switchback passage is open at its one end opposite to said switchback junction so as to expel a part of the document out of said switchback passage.

4. A document feeding device according to claim 2, wherein said switchback passage is open at its one end opposite to said switchback junction so as to expel a part of the document out of said switchback passage.

5. A document feeding device according to claim 1, further comprising a switchback switching member disposed at said switchback junction for selectively sending the document fed through said supply junction into said switchback passage or toward said image reading point through said transport passage.

6. A document feeding device according to claim 1, further comprising a discharge switching member disposed at said discharge junction for selectively sending the document fed through said image reading point to said discharge passage or said return passage.

7. A document feeding device according to claim 1, further comprising a switchback switching member disposed at said switchback junction for selectively sending the document fed through said supply junction into said switchback passage or toward said image reading point through said transport passage, and a discharge switching member disposed at said discharge junction for selectively sending the document fed through said image reading point to said discharge passage or said return passage.

8. A document feeding device to be attached onto an image processing device having image reading means to automatically feed and discharge one or more documents relative to an image reading point, comprising:

a document supply part having a supply tray for stacking said one or more documents thereon, a supply passage, and a document forwarding mechanism for sending out said documents stacked on said supply tray one by one through said supply passage, a document transport part having a forwarding roller rotatable in one document forwarding direction, a transport passage formed around said forwarding roller, said transport passage including a supply junction, a switchback junction, an image reading point at which said image reading means is placed substantially opposite to said supply junction across said forwarding roller, and a discharge junction substantially opposite to said switchback junction across said forwarding roller, said supply junction, switchback junction, image reading point and discharge junction being lined along said transport passage in order in said document forwarding direction, said transport passage including a return passage between said discharge junction and said supply junction, a switchback part having a switchback passage connected with said transport passage at said switchback junction, and reversible switchback rollers for moving the document back and forth along said switchback passage, and a document discharge part having a discharge passage connected with said transport passage at said discharge junction, and a discharge tray to which the document is discharged through said discharge passage, wherein the document having images to be read on both sides is sent out from said supply tray by said document forwarding mechanism, forwarded to said switchback passage through said supply junction and switchback junction, sent back from said switchback passage toward said image reading point through said switchback junction and transport passage, subjected to image processing to read the image on one side thereof while passing through said image reading point, sent into said switchback passage through said return passage and switchback junction, sent back from said switchback passage toward said image reading point through said switchback junction and transport passage leading to said image reading point, subjected to image processing to read the image on the other side thereof while passing through said image reading point, and sent out to said discharge tray through said discharge passage.

9. A document feeding device according to claim 8, wherein one of said reversible switchback rollers is provided with lifting means and separable from the other switchback roller by operating said lifting means.

10. A document feeding device according to claim 8, wherein said switchback passage is open at its one end opposite to said switchback junction so as to expel a part of the document out of said switchback passage.

11. A document feeding device according to claim 9, wherein said switchback passage is open at its one end opposite to said switchback junction so as to expel a part of the document out of said switchback passage.

12. A document feeding device according to claim 8, further comprising a switchback switching member disposed at said switchback junction for selectively sending the document fed through said supply junction into said switchback passage or toward said image reading point through said transport passage, and a discharge switching member disposed at said discharge junction for selectively sending the document fed through said image reading point to said discharge passage or said return passage.

13. A document feeding device to be attached onto an image processing device having image reading means to automatically feed and discharge one or more documents relative to an image reading point, comprising:

a document supply part having a supply tray for stacking said one or more documents thereon with their odd-numbered pages upward, a supply passage, and a document forwarding mechanism for sending out said documents stacked on said supply tray one by one through said supply passage, a document transport part having a forwarding roller rotatable in one document forwarding direction, a transport passage formed around said forwarding roller, said transport passage including a supply junction, a switchback junction, an image reading point at which said image reading means is placed substantially opposite to said supply junction across said forwarding roller, and a discharge junction substantially opposite to said switchback junction across said forwarding roller, said supply junction, switchback junction, image reading point and discharge junction being lined along said transport passage in order in said document forwarding direction, said transport passage including a return passage between said discharge junction and said supply junction, a switchback part having a switchback passage connected with said transport passage at said switchback junction, and reversible switchback rollers for moving the document back and forth along said switchback passage, one of said switchback rollers being provided with lifting means and separable from the other switchback roller by operating said lifting means, and a document discharge part having a discharge passage connected with said transport passage at said discharge junction, and a discharge tray to which the document is discharged through said discharge passage, wherein the document having images to be read on both sides is sent out from said supply tray by said document forwarding mechanism, forwarded to said switchback passage through said supply junction and switchback junction, sent back from said switchback passage toward said image reading point through said switchback junction and transport passage, subjected to image processing to read the image on one side thereof while passing through said image reading point, sent into said switchback passage through said return passage and switchback junction, sent back from said switchback passage toward said image reading point through said switchback junction and transport passage leading to said image reading point, subjected to image processing to read the image on the other side thereof while passing through said image reading point, and sent out to said discharge tray through said discharge passage.

14. A document feeding device according to claim 13, wherein said switchback passage is open at its one end opposite to said switchback junction so as to expel a part of the document out of said switchback passage.

15. A document feeding device according to claim 13, further comprising a switchback switching member disposed at said switchback junction for selectively sending the document fed through said supply junction into said switchback passage or toward said image reading point through said transport passage, and a discharge switching member disposed at said discharge junction for selectively sending the document fed through said image reading point to said discharge passage or said return passage.

* * * * *

UNITED STATES PATENT AND TRADEMARK OFFICE
CERTIFICATE OF CORRECTION

PATENT NO. : 5,926,681
DATED : July 20, 1999
INVENTOR(S) : Shuji Ishimaru

It is certified that error appears in the above-identified patent and that said Letters Patent hereby corrected as shown below:

Please correct the Assignee's name on the face of the patent to read as follows:

Item
[73] Assignee: Nisca Corporation, Yamanashi-ken, Japan

Signed and Sealed this

Eighth Day of February, 2000

Attest:

Q. TODD DICKINSON

*Attesting Officer*    *Commissioner of Patents and Trademarks*